United States Patent
Wang

(10) Patent No.: US 7,417,796 B2
(45) Date of Patent: Aug. 26, 2008

(54) WAVELENGTH DISCRIMINATION FILTER FOR INFRARED WAVELENGTHS

(75) Inventor: Xinghua Wang, Pittsburgh, PA (US)

(73) Assignee: ChemImage Corporation, Pittsburgh, PA (US)

( * ) Notice: Subject to any disclaimer, the term of this patent is extended or adjusted under 35 U.S.C. 154(b) by 0 days.

(21) Appl. No.: 11/537,233

(22) Filed: Sep. 29, 2006

(65) Prior Publication Data

US 2008/0080050 A1    Apr. 3, 2008

(51) Int. Cl.
G02B 5/30    (2006.01)

(52) U.S. Cl. ............... 359/498; 359/352; 359/501; 349/201

(58) Field of Classification Search .............. None
See application file for complete search history.

(56) References Cited

U.S. PATENT DOCUMENTS

| | | | |
|---|---|---|---|
| 3,647,279 A | 3/1972 | Sharpless et al. |
| 4,197,008 A | 4/1980 | Pinnow et al. |
| 4,394,069 A | 7/1983 | Kaye |
| 4,848,877 A | 7/1989 | Miller |
| 5,247,378 A | 9/1993 | Miller |
| 5,387,920 A | 2/1995 | Bos et al. |
| 5,483,387 A | 1/1996 | Bauhahn et al. |
| 5,689,317 A | 11/1997 | Miller |
| 5,892,612 A | 4/1999 | Miller et al. |
| 5,943,129 A | 8/1999 | Hoyt et al. |
| 5,953,083 A | 9/1999 | Sharp |
| 5,953,087 A | 9/1999 | Hoyt |
| 6,028,656 A | 2/2000 | Buhrer et al. |
| 6,172,722 B1 | 1/2001 | Sharp |
| 6,310,673 B1 | 10/2001 | Sharp |
| 6,373,568 B1 | 4/2002 | Miller et al. |
| 6,373,614 B1 | 4/2002 | Miller |
| 6,403,947 B1 | 6/2002 | Hoyt et al. |
| 6,417,892 B1 | 7/2002 | Sharp et al. |
| 6,421,131 B1 | 7/2002 | Miller |
| 6,455,861 B1 | 9/2002 | Hoyt |
| 6,501,548 B1 | 12/2002 | Oldenbourg |

(Continued)

FOREIGN PATENT DOCUMENTS

WO    WO 00/074384    7/2000

(Continued)

OTHER PUBLICATIONS

E. O. Ammann, 'Synthesis of Optical Birefringent Networks', Progress In Optics IX, Amsterdam, North-Holland Pub. Co., New York Interscience Publishers, 1971, pp. 123-177.*

(Continued)

Primary Examiner—Stephone B. Allen
Assistant Examiner—Derek S Chapel
(74) Attorney, Agent, or Firm—Duane Morris LLP

(57) ABSTRACT

An optical comb filter has polarizers placed before and after two or more birefringent elements, each having a fixed retarder and an aligned tunable liquid crystal. The birefringent elements are equal in birefringence and thickness and are tuned in unison. Wavelength-dependent polarization state changes are contributed by retardation in unequal proportions on the fast and slow axes of the successive birefringent elements. The filter is tolerant of rotational alignment errors. A two element filter uses angles of 22.5 and 67.5°; a three element version has 12.5, 45 and 77.5°; and a four element filter has 7.5, 29.5, 60.5 and 82.5°; all these angles being ±5°.

21 Claims, 8 Drawing Sheets

U.S. PATENT DOCUMENTS

| | | |
|---|---|---|
| 6,527,849 B2 | 3/2003 | Dry |
| 6,535,257 B2 | 3/2003 | Miller |
| 6,552,836 B2 | 4/2003 | Miller |
| 6,566,143 B2 | 5/2003 | Hoyt |
| 6,665,072 B2 | 12/2003 | Hoyt |
| 6,674,527 B2 | 1/2004 | Hoyt |
| 6,690,466 B2 | 2/2004 | Miller et al. |
| 6,693,710 B1 | 2/2004 | Hoyt |
| 6,717,706 B2 | 4/2004 | Miller et al. |
| 6,734,962 B2 | 5/2004 | Treado et al. |
| 6,750,964 B2 | 6/2004 | Levenson |
| 6,781,736 B2 | 8/2004 | Hoyt et al. |
| 6,927,834 B2 | 8/2005 | Deary |
| 6,985,216 B2 | 1/2006 | Treado et al. |
| 6,992,809 B1 * | 1/2006 | Wang et al. ............ 359/279 |
| 6,999,155 B2 * | 2/2006 | Tillin et al. ............ 349/193 |
| 7,019,296 B2 | 3/2006 | Treado et al. |
| 7,068,357 B2 | 6/2006 | Treado et al. |
| 2001/0033376 A1 | 10/2001 | Hoyt |
| 2003/0117705 A1 | 6/2003 | Hoyt |
| 2007/0024779 A1 | 2/2007 | Sharp |

FOREIGN PATENT DOCUMENTS

| | | |
|---|---|---|
| WO | WO 01/102799 | 1/2001 |
| WO | WO 01/111343 | 2/2001 |
| WO | WO 01/128224 | 4/2001 |
| WO | WO 01/163260 | 8/2001 |
| WO | WO 01/163261 | 8/2001 |
| WO | WO 01/163262 | 8/2001 |
| WO | WO 01/181990 | 11/2001 |
| WO | WO 02/219016 | 3/2002 |
| WO | WO 02/244800 | 6/2002 |
| WO | WO 02/092516 | 11/2002 |

OTHER PUBLICATIONS

S. E. Harris et al., 'Optical Network Synthesis Using Birefringent Crystals. I. Synthesis of Lossless Networks of Equal-Length Crystals', Journal Of The Optical Society Of America, vol. 54, No. 10, Oct. 1964, pp. 1267-1279.*

Beckers, et al., "Observing the sun with a fully tunable Lyot-Ohman filter". Applied Optics, vol. 14, No. 9 pp. 2061-2066 (1975).

Call, et al., "Application of a Liquid Crystal Tunable Filter to Near-Infrared Spectral Searches". SETICon02 (2002).

Chu, et al., "Birefringent filter synthesis by use of a digital filter design algorithm". Applied Optics, vol. 41, No. 17 pp. 3412-3418 (2002).

Deng, et al., "Inhomogeneous distribution of brightness in the split-element filter". Applied Optics, vol. 36, No. 7 pp. 1576-1579 (1997).

Evans, "The Birefringent Filter". J. Opt. Soc. Amer., vol. 39, No. 3 pp. 229-242 (1949).

Katzenstein, et al., "Realization of a New Type of Birefringent Filter". Applied Optics, vol. 10, No. 5 pp. 1119-1124 (1971).

Leroy, "Solc Elements in Lyot-Oehman Filters". J. Optics vol. 11, No. 5 pp. 293-304 (1980).

Lyot. "Comptes rendus hebdomadaires des seances de Acadamie des science". pp. 1593-1595 (1933).

Preuss, et al., "Three-stage birefringent filter tuning smoothly over the visible region theoretical treatment and experimental design". Applied Optics, vol. 19, No. 5 pp. 702-710 (1980).

Saeed, et al., "Multispectrum, spatially addressable polarization interference filter". J. Opt. Soc. Am. A, vol. 19, No. 11 pp. 2301-2312 (2002).

Scheffer, "New multicolor liquid crystal displays that use a twisted nematic electro-optical cell". J. Appl. Phys., vol. 44, No. 11 pp. 4799-4803 (1973).

Shabtay, et al., "Tunable birefringent filters—optimal iterative design". Optics Express, vol. 10, No. 26 pp. 1534-1541 (2002).

Solc. "Birefringent Chain Filters". Opt. Soc. Am. vol. 55, No. 6 pp. 621-625 (1965).

Staromlynska, et al., "High-performance tunable filter". Applied Optics, vol. 37, No. 6 pp. 1081-1088 (1998).

Title, et al. "Tunable birefringent filters". Opt. Eng. 20, pp. 815-823 (1981).

Wang, et al., "Optimal design of birefringent filter with a flat-top passband". J. Opt. A: Pure Appl. Opt. 8 pp. 652-656 (2006).

Wu, et al., "Liquid-crystal-based switchable polarizers for sensor protection". Applied Optics, vol. 34, No. 31 pp. 7221-7227 (1995).

Yariv, et al. "Optical Waves in Crystals". Chapter 5 (1984).

Ye, "Liquid-crystal bandpass filter based on the optical rotary dispersion effect". Applied Optics, vol. 34, No. 20 p. 4007-4010 (2004).

Ye, "Low-loss birefringent spectral filters comprising three identical retarders". Applied Optics, vol. 45, No. 31 pp. 8044-8051 (2006).

Ye, "Low-loss tunable filter based on optical rotary dispersion". Applied Optics, vol. 45, No. 6 p. 1162-1168 (2006).

Zhou, et al., "Nearly-off-axis transmissivity of Solc birefringent filters". J. Opt. Soc. Am. A, vol. 20, No. 4 pp. 733-740 (2003).

Wu, "Design of a liquid crystal based electrooptic filter". Applied Optics, vol. 28, No. 1 pp. 48-52 (1989).

* cited by examiner

Finesse= 3.42

Finesse = 4.03

Fused Silica SiO$_2$ (Infrared Grade)    Wavelength in Microns

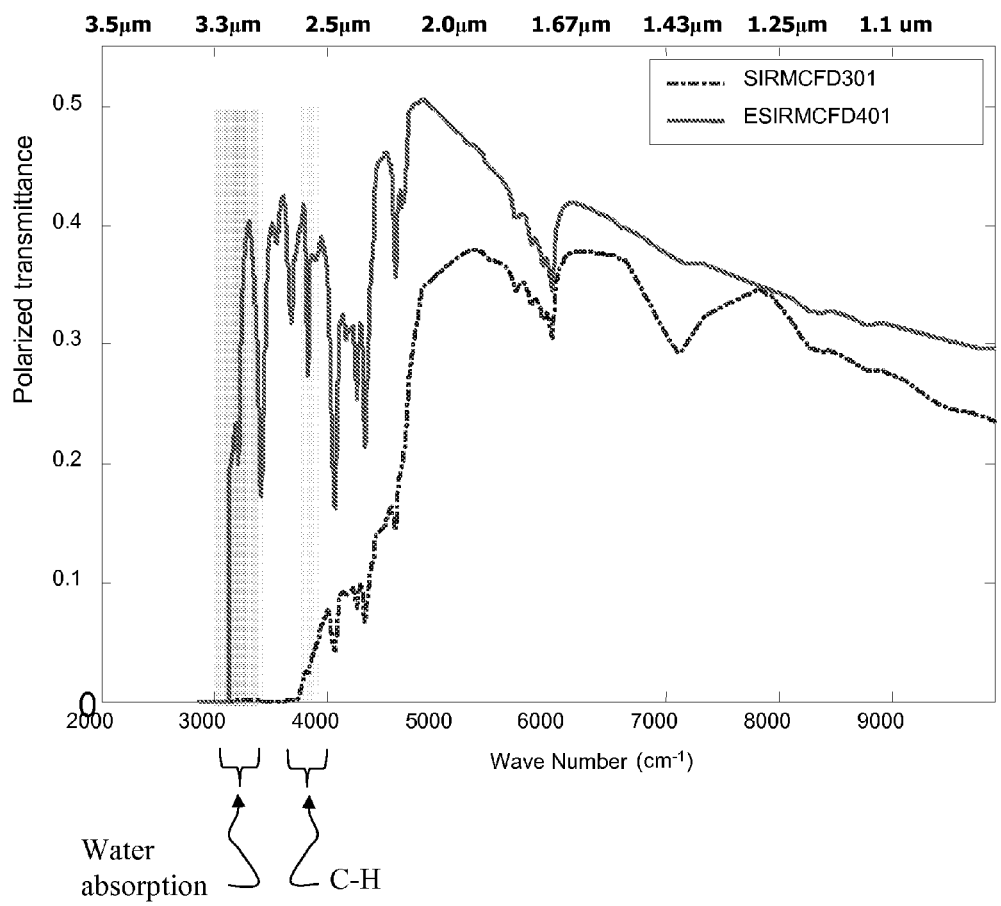
FIG. 18  Comparison of Two Filter Designs
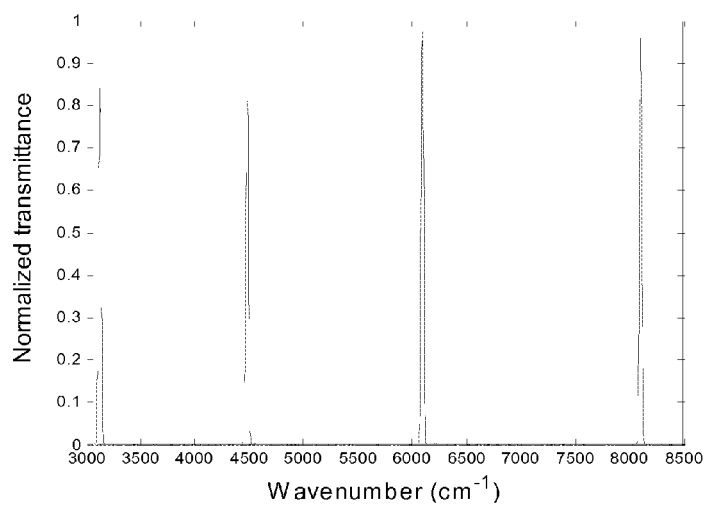
FIG. 19

WAVELENGTH DISCRIMINATION FILTER FOR INFRARED WAVELENGTHS

BACKGROUND

This disclosure concerns an optical interference filter wherein rotationally displaced birefringent retarders and associated polarizers discriminate light by wavelength, with a comb filter transmission characteristic.

The disclosed filter has a minimum number of birefringent retarder elements, in particular only from two to four, which can have liquid crystals for tuning. Empirical solutions for rotational orientation of the retarders are disclosed that are not integer fractions of $\pi$ radians. The filters nevertheless have good in-band versus out-of-band discrimination, and are tolerant of rotational alignment errors. The filter is useful for operation in infrared wavelength bands. The minimum number of interfaces reduce the incidence of reflection and absorption. Materials are disclosed that optimize the filter for these bands.

RELATED ART

Optical interference filters such as those of the Lyot, Evans and/or Solc configurations comprise polarizers and birefringent retarders. Birefringent elements, by definition, are characterized by different optical refractive indices for vector components of propagating light that are parallel to mutually orthogonal "fast" and "slow" axes of the birefringent element, typically a crystal. When light propagates through the birefringent element, the vector component that is parallel to the slow axis is delayed, compared to the vector component parallel to the fast axis.

There is a propagation delay through the birefringent element for both components. The difference in optical index causes a phase displacement of one vector component relative to the other. The phase displacement affects polarization state.

The differential delay of vector components propagating along the fast and slow axes of a birefringent element is determined in part by the difference between the two optical indices of refraction of the birefringent element. The difference might be quantified in terms of a difference in time to propagate through the thickness of the birefringent crystal, or the difference might be quantified as a difference in propagation distance over a given time.

A given time or a given distance corresponds to some phase angle at a given wavelength. At a relatively shorter wavelength, a given distance encompasses a larger phase angle over the shorter wavelength or period, than the same distance would encompass over at a relatively longer wavelength. As a result, the differential phase delay produced by a birefringent element, if expressed as degrees or radians at some given wavelength rather than as a time or distance, varies as a function of wavelength.

Certain aspects of the polarization state of propagating light concern the relative amplitude and phase relationships of mutually orthogonal vector components of the electromagnetic light wave. Inasmuch as a birefringent element produces a delay that constitutes a different phase angle at different wavelengths, the birefringent element can induce a change in polarization state as a function of wavelength. That is, the birefringent element produces a different specific change in polarization state for light at different wavelengths. If an input signal comprises plural wavelengths in a given polarization state, then propagation of the signal through a birefringent element will produce an output signal wherein the different wavelengths have different polarization states.

Optical interference filters spread the spectrum of light over a range of polarization states in a manner that is somewhat similar to using the wavelength dependent characteristics of refraction at a surface, for example with a prism, to spread the spectrum of light wavelengths over a range of divergence angles. However, phase relationships and their resulting polarization states recur in a periodic manner. A particular plane polarization orientation can be selected by the orientation of an output or selection polarizer in an optical interference filter. The transmission function of the filter with the selection polarizer has multiple peaks and/or notches, i.e., a so-called comb filter transmission characteristic.

U.S. Pat. No. 6,992,809, which is hereby incorporated, discloses a generalized band pass filter wherein a cascade of filter stages is provided, and the stages each comprise a succession of birefringent elements. The birefringent elements are tunable by means of liquid crystals that are optically aligned to and abutted against fixed retarders with which the liquid crystals form pairs. The liquid crystals add to the fixed retarders a thickness and an electrically controllable amount of birefringence.

In a birefringent interference filter, plural successive birefringent elements are disposed along a light propagation path or axis, such that the propagation path is normal to the fast and slow axes of the birefringent elements. The birefringent elements can be fixed in birefringence, or the filter can be tunable as in U.S. Pat. No. 6,992,809.

The successive birefringent elements are designed by their thickness, birefringence and rotational displacement from one element to the next, to complement a change in polarization state and/or orientation for a particular wavelength (or series of periodically related wavelengths). The successive elements are all dimensioned and rotationally aligned appropriately, so that a specific change in polarization state is achieved by which wavelengths finally are discriminated. Tuning the birefringence using the liquid crystals (which are adjusted in unison), increases or decreases the retardation. When tuned, the differential retardation time or distance corresponds to a new wavelength (or more accurately, at a new comb characteristic series of periodically related wavelengths) that are discriminated.

In a simple conventional example, an interference filter operating on randomly polarized broadband light might have an input polarizer that admits only the vector components of all wavelengths that have a polarization orientation parallel to the optical orientation of the polarizer. This signal is might then be applied to a first birefringent element, arranged, for example, with fast and slow axes at 45° to the polarizer, so that equal vector components of the polarized light propagate along the fast and slow axes. The birefringent element retards the component parallel to the slow axis, relative to the component parallel to the fast axis.

The retardation is a different phase angle value according to the wavelength of the light. For certain wavelengths, the phase retardation of the slow component may correspond precisely to some division of a full period. For example, the phase difference might correspond to an integer multiple of $\pi$ radians (180°, 360°, 540°, 720° . . . etc.) at a succession of related wavelengths. Multiple birefringent elements along a light propagation path in a filter can be configured to contribute a predetermined phase retardance at a selected discrimination wavelength, for example to total an integer multiple of $\pi$ radians over a succession of birefringent elements. The respective thicknesses of the birefringent elements are coordinated with the respective rotational orientation of the fast and slow axes of each birefringent element to make this occur.

Each birefringent element in a tunable arrangement typically has at least one fixed crystal and at least one adjustable liquid crystal in optical alignment with the fixed crystal and abutted against the fixed crystal, forming a pair with an optical orientation. The optical orientations from every such pair to the next pair are rotationally displaced to complement the discrimination wavelength (and periodically related wavelengths). Each iterative pair helps to more accurately discriminate the specific wavelengths from other wavelengths. At the end of the succession of birefringent elements, the specific wavelengths emerge in a plane polarized state with a given rotational orientation. A selection polarizer can be aligned to this rotational orientation in a band pass filter configuration, or can be placed orthogonal thereto in a band stop filter configuration.

U.S. Pat. No. 6,992,809 discloses arrangements having cascaded stages wherein one or more stages having a transmission spectrum with narrow passbands can be cascaded with one or more other stages having large free spectral range. In some embodiments there are a large number of birefringent elements. A selection polarizer at the end of a first stage constitutes the input polarizer by which plane polarized spectrally filtered light is admitted to the next state in the cascade. The overlapping peaks in the transmission spectra of the cascaded filter stages define the passband for the cascaded filter stages as a whole. The rejection ratios of the stages are multiplied. A wide passband in a stage with good free spectral range can overlap and thereby select a narrower passband in a different stage that may have a transmission characteristic with narrow passbands but less widely spaced peaks. The result is a high filter finesse ratio, defined as the ratio of free spectral range space between adjacent pass bands ("free spectral range" is abbreviated "FSR"), to full width half maximum ("FWHM") passband width. (Finesse=FSR/FWHM.)

One object of both band pass and band stop filter configurations is to provide a very high degree of discrimination between the wavelength bands that are passed and those that are blocked. In a band pass filter configuration, one or more desired pass bands preferably are discriminated so as to be transmitted with as little attenuation as possible, whereas out-of-band wavelengths are heavily attenuated. In a band stop filter, the discriminated stop band(s) should be substantially extinguished, whereas wavelengths outside of the stop band should be attenuated as little as possible.

A filter as described can be designed with a large number of birefringent elements. Each birefringent element (typically comprising a fixed and a tunable birefringent part) contributes to improving discrimination between selected and rejected wavelengths, because each one advances only the discriminated wavelength band(s) toward the distinct polarization state. On the other hand, providing many such retarders results in many layers of material, possibly with considerable thickness, and with many junctions between elements where material impurities may produce diffusion or reflection, wavelengths may be absorbed or reflected due to the physical aspects of the materials, and mismatches between optical refractive indices can lead to reflections.

There are design tradeoffs encountered between providing a filter with many phase retardation elements, both tunable and fixed, versus providing a filter with high transmission and also high rejection ratios between wavelengths that are transmitted versus absorbed or reflected. This challenge is acute in certain wavelength bands, including bands extending into the infrared. These wavelengths have some useful applications in connection with chemical imaging and the like, but are absorbed by materials and by structures that are used in conventional filters using polarization and birefringence, and in particular by such filters including liquid crystal tunable elements. It would be advantageous to provide improved filter configurations, materials and techniques to optimize the concept for these wavelengths.

Known tunable filters in the infrared ("IR") spectral area have relatively limited transmission ratios. Products with IR spectral ranges are available, for example, from Meadowlark Optics, Inc. (Frederick, Colo.) and from Cambridge Research & Instrumentation, Inc. (Woburn, Mass.), with transmission ratios on the order of 15 to 25%. It would be desirable to provide an IR spectral filter that a good transmission ratio as well as good out of band rejection and a narrow pass band. Chemimage Corporation (Pittsburgh, Pa.) provides multi-conjugate spectral filters for fluorescence and Raman imaging applications, with high out of band rejection and transmission ratios of 35 to 45%, but these filters are operable in the visible spectrum up to about 750 nm. It would be desirable to provide an IR spectral filter with comparable filter characteristics.

A tunable filter with good out of band rejection, operable in the short wavelength infrared region (e.g., 1800 to 3200 nm), would be useful in vibrational spectroscopy (e.g., IR spectroscopy). But, light absorption by many candidate materials is very strong in this wavelength range. Many common glass substrates that might be used in the supporting plates of a liquid crystal element have strong absorption in the 2400 to 3500 nm range (wave number 4167 to 2857 $cm^{-1}$). Absorption by impurities in glass and other optical components can strongly affect absorption characteristics in this range. Water introduced during assembly and gluing can introduce absorption.

Water absorption and also the typical presence C—H (carbon-hydrogen) bonds in the structure of various filter elements, including liquid crystal material and other polymers, also lead to limited transmission in IR wavelengths. What is needed is a tunable filter whose performance, especially through in the C—H stretch region, is characterized by a high transmission ratio, and which need not be made from exotic and/or expensive materials.

SUMMARY

An object of the present disclosure is to apply birefringent interference filters to near infrared and short infrared spectral bands. In this disclosure, wavelengths longer than about 0.7 micro meter are generally termed infrared wavelengths.

Birefringent optical elements are used to impart a shift in polarization state as a function of wavelength, by differential retardation of electromagnetic vector components of the light signal that are parallel to one or the other of mutually orthogonal fast and slow axes of the birefringent element. Plural phase retarding birefringent elements are used in the present filters. Tunable birefringent liquid crystals are optically aligned with and abutted against fixed birefringent crystals, for adjusting the combined birefringence of the paired fixed and tunable crystals, enabling tuning of a periodic comb filter transmission spectrum.

According to one aspect of the disclosed filter, the number of successive rotationally displaced birefringent elements is kept to a minimum, thereby minimizing the number of interfaces between such elements, where absorption and reflection might otherwise occur.

The disclosed filter structure also has counterintuitive specific relative rotational orientations among the birefringent elements and between the birefringent elements and the polarizers. The rotational orientations of the fast and slow axes of each given birefringent element in the sequence, according to several disclosed filter embodiments, are arranged relative to the light emerging from the preceding birefringent element (or from an input polarizer) such that the available light energy is divided unequally between the vector light components parallel to the fast and slow axes of said given birefringent element. Interference filters of the standard Lyot, Solc and Evans configurations typically employ a sequence of rotational displacements that are substantially equal. For example in a Solc fan or folded configuration, the progressive angular displacement angles and/or the alternating rocking angles between birefringent elements are equal and are a mathematical function of the total rotational displacement between the input polarizer and the output selection polarizer and the number of birefringent elements. The presently disclosed filter structure departs from such equiangular techniques by employing a symmetrical but unequal set of rotational displacements that nevertheless total 90° ($\pi/2$ radians) for a two retarder filter stage, or 135° ($3\pi/4$) for a three retarder stage, or 180° ($\pi$) for a four retarder stage, etc., in each case between parallel input and selection polarizers.

The disclosed filter arrangements are characterized by distinctly unequal amplitudes for the vector components that are parallel to the respective fast and slow axes of the retarders, and by an unequal distribution among the birefringent elements of the total angle of rotational displacement between the input and output selection polarizers. However, such arrangements have been found to have certain practical advantages. In addition to providing good out-of-band rejection, the disclosed filter arrangements have been found to be more tolerant of errors in rotational orientation of the birefringent elements than conventional configurations. The disclosed filter is functional with angular rotation errors of up to ±5°.

By minimizing the number of birefringent elements, the number of interfaces at abutting surfaces are minimized, as are the number of tunable liquid crystals needed. These aspects are apt for extended wavelength operation into the infrared region. The present disclosure further provides for use of materials that have limited light energy absorption characteristics in the infrared wavelength region.

As few as two birefringent elements are provided according to one embodiment, oriented at specific rotation angles relative to input and output polarizers. Up to four birefringent elements are provided in other embodiments. The relative orientations of the input and output polarizers to the respective first and last birefringent elements, and the rotational displacements from one birefringent element to the next, have been separately arrived at by empirical testing, for their out of band rejection characteristics, and have been found to be tolerant of rotational positioning error at a level of error that might be expected in typical manufacturing.

In practical applications, the invention is useful to select for very narrow spectral bands in connection with vibrational imaging, such a Raman spectral microscopy. The invention is not limited to this application or even to pass band filtering. For example by turning the selection polarizer to an orientation that is orthogonal to the particular distinct polarization state distinguishes the comb filter peaks in a pass band application (which can be termed the discrimination band(s)), the same structure functions as a band stop filter.

Additional objects and aspects of the subject filter will become apparent from the following discussion of exemplary embodiments.

BRIEF DESCRIPTION OF THE DRAWINGS

The presently disclosed filter and its associated methods are capable of embodiment in various specific ways. The appended drawings and the discussion of examples are intended to be illustrative rather than limiting. Throughout the drawings, comparable elements are labeled with the same reference numbers to identify corresponding elements. However in accordance with the description, reference numbers that are mentioned early in the description have not been repeated in all the drawings that are discussed afterwards, to avoid complication. In the drawings.

FIG. 18 is a plot of a transmission window comparing two filter designs that are discussed in detail in this disclosure.

FIG. 19 is a normalized transmission spectrum of a filter according to one of the plots in FIG. 18, showing four tuned peaks.

DETAILED DESCRIPTION

A spectral filter uses a succession of birefringent elements to establish and to interfere at a selection polarizer vector components of a light input signal. The light input signal is processed through a succession of birefringent elements that are rotationally displaced. The birefringent elements adjust the polarization state of the light as a function of wavelength.

More specifically, the birefringent elements produce phase displacement of vector components comprising a change in polarization state. A comb filter succession of spectral bands assume a polarization state that is transmitted by a selection polarizer at an output of the filter. The transmitted band or bands are termed the discrimination band(s).

This type of filter that relies on birefringence and polarization is generally known as an birefringent interference filter, and there are a number of known configurations of such filters that establish a polarizations states as a function of wavelength and then pass or block specific discrimination bands as a function of polarization state. Although certain possible configurations of birefringent interference filters may employ a large number of birefringent elements, and may be tunable using liquid crystals that are optically aligned with and are appended to fixed crystals, the present disclosure is specifically directed to new versions and embodiments that are particularly apt for infrared wavelengths.

The techniques of the invention are useful over a span of wavelengths including longer wavelengths at the end of the visible spectrum and shorter wavelengths extending into the invisible infrared spectrum. A spectral range of particular interest is approximately 1800 to 3200 nm (wave numbers 5555 to 3125 $cm^{-1}$).

Figure 1:
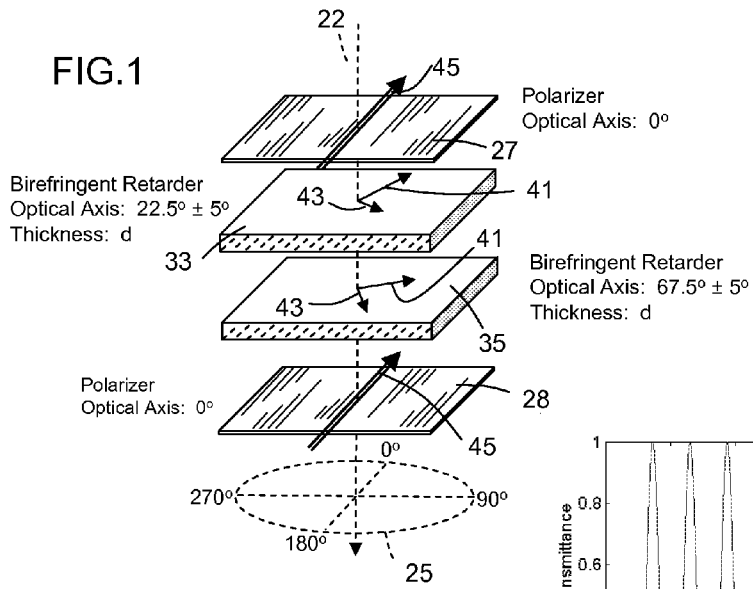
FIG. 1 is a schematic depiction of an embodiment of the filter according to the present disclosure, employing two equal birefringent elements that are rotationally displaced arranged for propagation of light in a vertical direction, between optically aligned polarizers.
Figure 2:
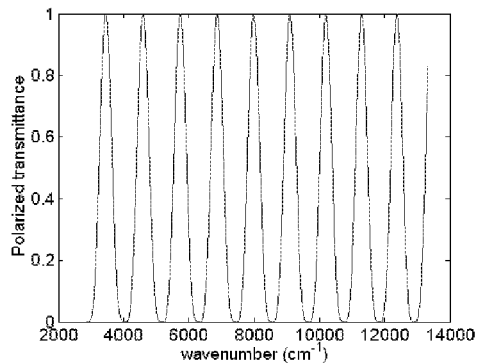
FIG. 2 shows a typical transmission spectrum according to the filter configuration shown in FIG. 1, characterized by a comb filter shape of successive transmission peaks and rejection notches at wavelengths that are related for reasons of birefringence and phase retardation as explained herein.
Figure 3:
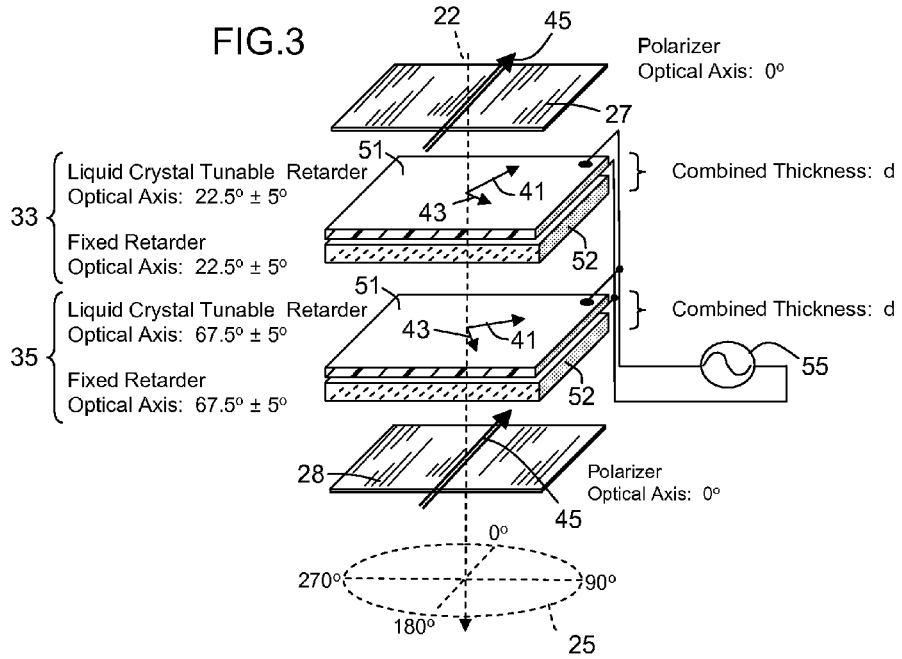
FIG. 3 is a schematic depiction of an embodiment that is configured according to FIG. 1, except that each of the two rotationally displaced birefringent elements comprises a set with an electrically tunable liquid crystal part and a fixed birefringent crystal part.
Figure 4:
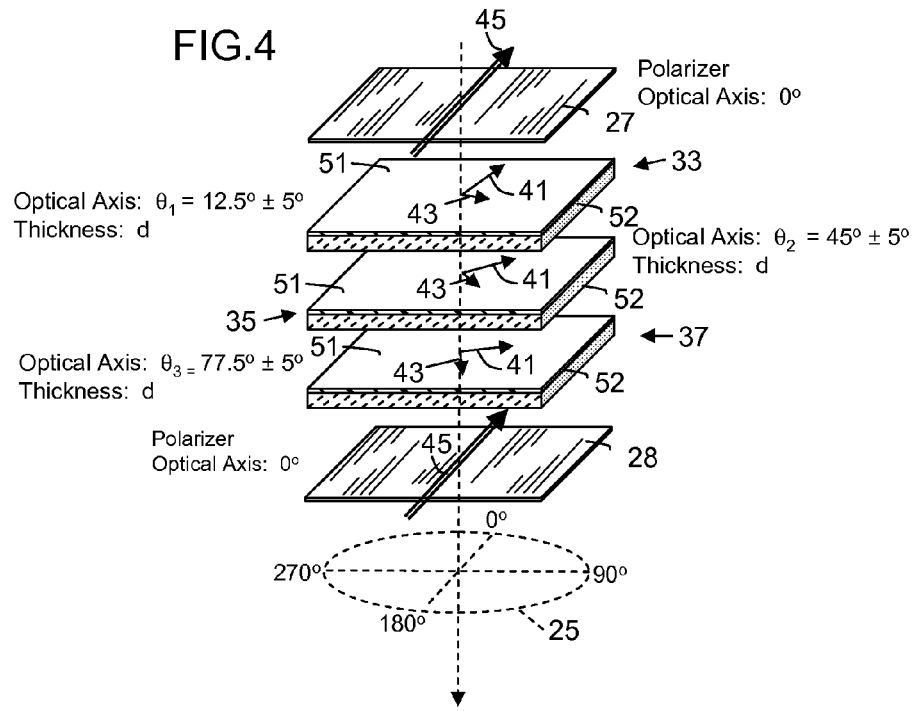
FIG. 4 is a schematic depiction of an embodiment having three rotationally displaced birefringent elements at specific rotational angles relative to aligned polarizers.
Figure 6:
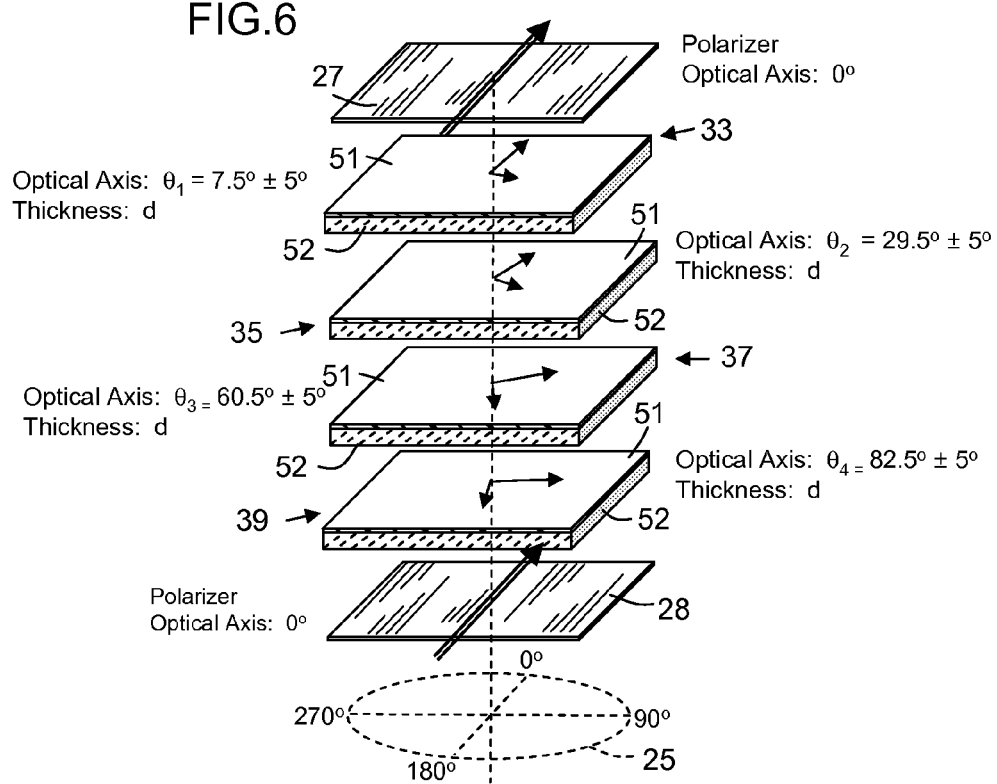
FIG. 6 is a schematic depiction of an embodiment having four rotationally displaced birefringent elements at specific rotational angles relative to aligned polarizers.
Figure 7:
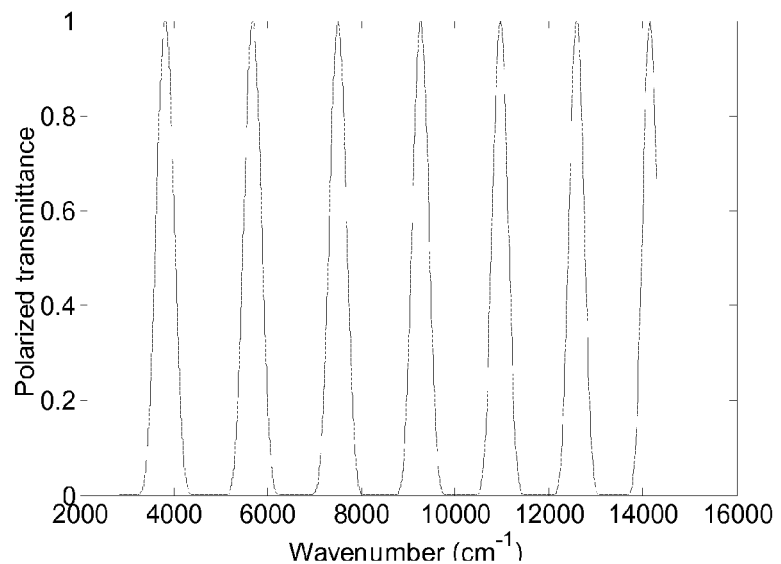
FIG. 7 is a plot of the transmission spectrum according to the filter configuration shown in FIG. 6.

Exemplary embodiments of the subject filter are illustrated in FIGS. 1, 3, 4 and 6, together with corresponding transmission spectra in FIGS. 2, 4 and 7. The concepts illustrated are also capable of other specific embodiments, as will become apparent. Subsequent FIGS. 8-17 demonstrate a number of structural and material selection that have been found to be effective in these embodiments, operating in the spectral range of interest. FIGS. 18 and 19 demonstrate and compare specific embodiments.

FIGS. 1, 3 4 and 6 are isometric projections that are exploded in that the optical elements are shown spaced from one another whereas in an actual embodiment the elements are abutted directly against one another. The direction of light projection in these figures is vertical along axis 22. The respective optical elements are normal to axis 22. The light propagation might be upward or downward with similar effect, but for convenience of explanation is assumed to be downward. The devices shown can be used in various spectral filtering applications, a nonlimiting example being forming a two dimensional spectral image. However the associated lenses for collecting an image that is transmitted through the filter and presenting it for viewing or for collection on a light sensor are not critical to the subject matter of this disclosure and accordingly have not been shown.

A projected circle 25 is shown in the isometric projections as a reference used in discussing the relative rotational orientations of the optical elements relative to one another around the axis 22. Reference circle 25 is shown only for convenience of explanation. There is no requirement that the filter as a whole must be disposed in any particular orientation or angle. The orientations refer specifically to optical orientations rather than to the orientation of the edges of the optical elements.

The optical elements of the filter comprise an entrance or input polarizer 27, a selection or output polarizer 28, and a plurality of birefringent elements that are oriented at different optical alignments around axis 22. The embodiment of FIG. 1 shows two birefringent elements 33, 35. The embodiment of FIG. 3 corresponds to FIG. 1 except that the birefringent elements are tunable. The embodiments of FIGS. 4 and 6 respectively have three or four birefringent elements 33, 35, 37, 39.

Referring to FIG. 1, birefringent elements by definition have a fast axis 41 and a slow axis 43 that are orthogonal to one another and to the propagation axis 22. Each birefringent element has different optical indices of refraction for light propagating through the birefringent element along the fast axis 41 and along the slow axis 43. This means that vector light components along these axes 41, 43 propagate at different speeds. One might envision parallel wave fronts of electromagnetic vector components that are polarized along the fast axis and the slow axis, wherein the fast axis wave front outpaces the slow axis wave front. A more pertinent aspect is that if the two polarization components are in phase when entering the birefringent element, then the components will be out of phase upon exiting. The retardation can produce a rotation in polarization orientation for certain wavelengths, which if carried on through each element of the filter, provides an output wherein those wavelengths are substantially exclusively aligned to the selection polarizer 28 and are transmitted.

The phase relationship of orthogonal components of a light signal, and the relative amplitudes of the components, define the polarization state of a light signal that comprises the two orthogonal components. Passing through the birefringent element thus changes the polarization state of any light that is not exclusively plane polarized to one axis 41, 43 or the other.

It would be possible to align the fast and slow axes 41, 43 of the initial birefringent element 33 at 45° to the axis 45 of the input polarizer 27, which would divide the input light energy equally into vector components along the fast and slow axes. However according to this embodiment, the fast and slow axes are arranged at angles wherein the vector components couple the light energy into both the fast and slow axes (i.e., neither of the fast and slow axes is precisely parallel to or perpendicular to the axis 45 of the input polarizer) but the light is not coupled into both axes equally. Instead, one of the fast and slow axes forms an acute angle less than 45° with the polarizer axis 45 and the other of the fast and slow axes forms an angle that is obtuse and greater than 90° relative to the polarizer axis. (The fast and slow axes are at right angles to one another.) Thus the input light is coupled more strongly to an axis at a lower angle $\alpha_1$ (in this example 22.5°) and less strongly to the other axis at a higher angle $\alpha_1+90°$ (in this example 112.5°). This occurs due to sine and cosine relationships of the vectors. It can be assumed that the axis at 22.5° is the fast axis for purposes of discussion, but the point is that the fast and slow axes rotationally offset from the optical axis 45 of polarizer 27 by an angle that not equal to 45° and thus does not attempt to divide the plane polarized light into equal power orthogonal vector components on the fast and slow axes.

The light emerging from the initial birefringent element has a polarization state that is altered to a state characterized by different amplitudes along the fast and slow axes, and by the fact that the slow axis has been delayed relative to the component along the fast axis. These two components parallel to axes 41, 43 of the initial birefringent element 33 are no longer in phase.

The two out of phase vector components In FIG. 1, propagate through the next birefringent element 35, which has a thickness d equal to the thickness of the initial birefringent element 33. The two relatively delayed light components parallel to the fast and slow axes 41, 43 of the first birefringent element 33 then encounter the orthogonal fast and slow axes of the second birefringent element. In the second birefringent element, the fast and slow axes are orients at still other angles $\alpha_2$ (in this example 67.5°) and $\alpha_2+90°$ (in this example 157.5°). It can be noted that $\alpha_2$ in this example is equal to $90°-\alpha_1$. Due to the relationship between $\alpha_1$ and $\alpha_2$, each of the two components that emerged (at unequal power) from the first birefringent element is now divided into two equal components according to the respective vectors (sine $45°$=cosine $45°$). There are now four components propagating through the filter with different polarizations states and orientations. These components are incident on the selection polarizer 28, wherein the polarization vector components that are parallel to one another can interfere.

It is a characteristic of the angular displacements in FIG. 1 that the polarizers 27, 28 are parallel (at zero or 180°). However the rotational displacements encompassed by the symmetry of the birefringent elements are arranged to presume a total rotational displacement of 90°. In FIG. 1, for example, there are three transitions involved, namely (1) from the input polarizer 27 to the first birefringent element 33, which is a rotational displacement equal to $\alpha_1$, namely 22.5°, then (2) from the first birefringent element to the next, equal to $\alpha_2+\alpha_1=90°$, and finally from the second birefringent element to the presumed total of 90°, equal to $\alpha_1$ or 22.5° in this embodiment. A series of rules can be deduced from these relationships, and are also reflected by the embodiments of FIGS. 4 and 6.

Specifically, an arrangement of 'n' birefringent elements (33, 35, 37, . . . etc.) is disposed between parallel polarizers 27, 28 that are at a reference angle zero. The rotational angle of the $n^{th}$ birefringent element is denominated $\alpha_n$. According to these exemplary embodiments, $\alpha_1 \neq 45°$. This results in an unequal distribution of available light energy along the fast and slow axes of the first birefringent element 33. Preferably, one of the fast and slow axes is oriented at substantially less than 45°, for example being from about $7.5°\pm5°$ to about $22.5°\pm5°$ in the examples discussed.

Also, $\alpha_{n-1}=(90°-\alpha_1)$, and the intermediate angles are symmetrically distributed. For example, $(\alpha_2-\alpha_1)=(\alpha_n-\alpha_{n-1})$. Within these rules, specific rotation angles have been determined empirically.

In the present disclosure, a number of embodiments are disclosed wherein the rotational displacement between the input polarizer 27 and the first birefringent element 33 has been selected empirically but in each case is characterized by unequal division of the plane polarized light between polarization vector components parallel to the fast and slow axes 41, 43. Different numbers of birefringent retarders are disclosed in the respective embodiments. The sum of the rotational displacement angles for all of the birefringent retarders 31, 33 (or 31, 33, 35 or 31, 33, 35, 37) is 90°. In connection with embodiments having three or more birefringent retarders, the rotational displacement angles also are caused to have a symmetrical relationship.

As discussed in the background, the differential delay though one or more birefringent elements is not a function of wavelength if the differential delay is expressed as distance. However the delay is a function of wavelength if expressed as phase angle. The phase angle delay aspect is the important aspect with respect to polarization because the phase relationship and relative amplitude of mutually orthogonal polarization components are the aspects that define the polarization state for the light, and it is routinely possible to have different wavelength components in different polarization states.

Assuming that the propagating light has a spectrum of many wavelengths, the birefringent retardation of the components as described affects the different wavelengths by a greater phase angle at shorter wavelengths and a smaller phase angle at longer wavelengths. The polarization state of the light is spread out, but there are certain wavelengths, including periodically related wavelengths in a comb filter transmission characteristic, that emerge from the birefringent elements 33, 35 in a polarization state that is strongly plane parallel to the selection polarizer. FIG. 2 shows the transmission characteristic that is obtained through the selection polarizer.

FIG. 3 illustrates an embodiment that corresponds to FIG. 1 in that there are two retarders 33, 35 in FIG. 3. The angle $\alpha_1$ of the first birefringent element is different from 45°, once again having orthogonal fast and slow axes at 22.5 and 112.5°. The sum of $\alpha_1$ and $\alpha_2$ is equal to 90°. The embodiment in FIG. 3 also operates as described relative to FIG. 1. However the embodiment of FIG. 3 is tunable.

Each of the birefringent elements 33, 35 in FIG. 3 comprises a tunable liquid crystal retarder 51 and a fixed retarder 52. The tunable and fixed retarders 51, 52 in each birefringent element 33, 35 are optically aligned with one another. That is, the fast and slow axes 41, 43 of the liquid crystal 51 each are parallel to the respective fast and slow axes of the fixed retarder 52, and together define the fast and slow axes 41, 43 of the birefringent elements 33, 35, each of which comprises a pair, namely liquid crystal 51 and fixed retarder 52.

The birefringent elements in FIG. 3 operate as described in FIG. 1, namely plane polarized light from the input polarizer 27 is unequally divided into polarization vector components that are relatively retarded by initial birefringent element 33, and the retarded components are divided again by the subsequent birefringent element 35. Periodically related wavelengths that have a polarization state parallel to the selection polarizer 28 are passed.

In FIG. 3, the thicknesses d of the respective birefringent elements 33, 35 are equal. The dimensions and birefringence of fixed retarders 52 is unchangeable, but the birefringence contributed by the tunable liquid crystal can be electrically controlled by a driving voltage source 55 that is coupled to control all the tunable liquid crystals in unison. Applying a voltage to increase the birefringence of the liquid crystals increases the difference in optical refractive indices in the liquid crystal, which is an effect similar to making the birefringent elements 33, 35 thicker. The operation of the filter remains the same, but the particular wavelengths that are transmitted by the selection polarizer change. Referring to FIG. 2, adjusting the birefringence of liquid crystals 51 laterally stretches or compresses the transmission characteristic.

It has been found in empirical testing that the specific angles of $\alpha_1$ and $\alpha_2$ can be varied while still maintaining reasonably good out of band rejection and a reasonably high transmission peak at the selected discrimination wavelength (i.e., the bands that are caused to align with the selection polarizer. A nominal tolerance of $\pm5°$ for $\alpha_1$ and/or for $\alpha_2$ is adequate for operation of the filter in typical imaging applications.

One aspect of the disclosed filter is that there are only a few optical components required to achieve the comb filter transmission characteristic shown in FIG. 2. The filter of claim 1 as described has a typical finesse value of 2.72, namely the average ratio of free spectral range (FSR), namely the space between peaks, to the width of the pass band, typically measured as the full band width at half maximum transmission amplitude (FWHM). Thus finesse=FSR/FWHM.

Figure 5:
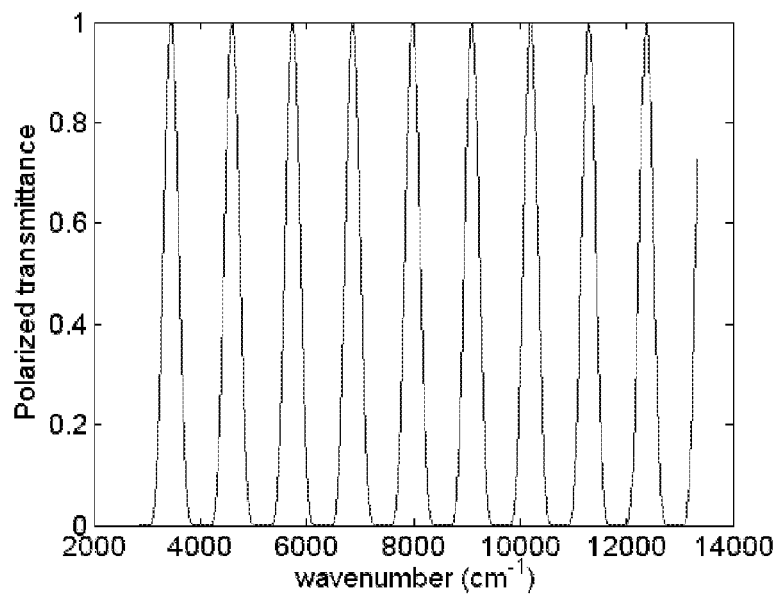
FIG. 5 is a plot of the transmission spectrum according to the filter configuration shown in FIG. 4.

The finesse of the filter arrangement can be improved by adding additional birefringent elements to the two elements 33, 35 in the configurations of FIGS. 1 and 2. FIG. 4 illustrates a three-birefringent element configuration. FIG. 5 illustrates a four-birefringent element configuration. FIGS. 4 and 5 each include liquid crystal tunable portions in each birefringent element, and (although the driving voltage is shown only in FIG. 3), the tunable liquid crystals are all driven in unison.

FIG. 4 has a three birefringence element configuration wherein the respective optical rotational orientations of the birefringence elements, as referenced to input and output selection polarizers 27, 28 at zero degrees, are set at:

$\theta_1 = 12.5° \pm 5°$;
$\theta_2 = 45° \pm 5°$; and,
$\theta_3 = 77.5° \pm 5°$.

These angles share with the embodiments of FIGS. 1 and 3 the aspect that the sum of the angular displacements or twist in polarization orientation account for a total of 90° ($\pi/2$ radians) between the polarizers and the adjacent birefringent elements (from 27 to 33 and 37 to 28), plus between the birefringent elements that are adjacent to one another (33 to 35 and 35 to 37). But the angular displacement of the polarizers is 180° ($\pi$ radians or an integer multiple thereof). In addition, the vector alignment of the input polarizer 27 to the first birefringent element is not equal to 45°, thereby providing unequal light energy in the two differentially retarded vector components emerging from the first birefringent element. As a result, the subsequently divided and relatively retarded components emerging from the subsequent birefringent elements 35, 37 are also unequal. The filter of FIG. 4 produces a transmission characteristic as shown in FIG. 5, with a finesse of 3.42.

FIG. 6 illustrates the further application of the foregoing aspects to a filter having four birefringent elements arranged at symmetrical rotational angles to encompass a twist totaling 90° between parallel input and selection polarizers 27, 28 (at zero degrees) and wherein the leading birefringent element 33 is arranged at an angle other than 45° to the input polarizer 27, thereby coupling unequal light energy from the plane polarized input to the fast and slow axes of the first birefringent element 33. In this embodiment with four birefringent elements and parallel polarizers at zero degrees, the optical alignment of the birefringent elements 33, 35, 37, 39 is such that either the fast or the slow axis of all four birefringent elements are oriented at:

$\theta_1 = 7.5° \pm 5°$;
$\theta_2 = 29.5° \pm 5°$;
$\theta_3 = 60.5° \pm 5°$; and,
$\theta_4 = 82.5° \pm 5°$.

The difference between $\theta_4$ and 90° is the same as the difference between $\theta_1$ and zero (the input polarizer 27 is aligned at zero degrees). The rotational displacement between birefringent elements 33 and 35 is equal to the rotational displacement between birefringent elements 37 and 39, in this case 22.5°. The remainder to make up a total twist of 90° is taken up in the rotational displacement between birefringent elements 35 and 37, in this case 31°.

The specific angles selected for the embodiment of FIG. 6 were selected by empirical testing with the same general rules as in FIGS. 1, 3 and 4. By coupling the plane polarized output of the input polarizer to the initial birefringent element 33 at an angle other then 45°, the interference action of the birefringent elements does not rely wholly on the rotational orientations that would maintain a progression of angular displacements (i.e., a twist) that is precisely correct. Instead, the invention also relies on alteration of the polarization state as defined by respective amplitudes of the polarization components in orthogonal directions. As a result, the filters of the disclosed embodiments are relatively more tolerant of rotational error than many conventional birefringent filters (e.g., classic Lyot, Evan, and Solc configurations).

The polarization state of a light signal can be defined by a normalized Stokes three by three matrix. The respective factors represent the extent to which the signal is plane or circularly polarized (a phase relationship), whether the signal is aligned at zero and 90° or 45° and 135°, etc. These factors are based in part on the respective amplitudes of the light signal along each of two orthogonal axes, which amplitudes can be made unequal in accordance with the foregoing filter embodiments. The tunable birefringent elements 33-39 serve to alter the polarization state, i.e., to reorient the polarization state in a manner that is not limited to changing the angular orientation defined by polarization components of equal amplitudes.

The disclosed filter embodiments produce comb filter outputs with normalized transmission characteristics as shown in FIGS. 2, 5 and 7, characterized by transmission peaks and rejection notches. These transmission characteristics are based on the illustrated embodiments wherein the output polarizer 28 is parallel to the input polarizer, but it is also possible to arrange the output polarizer 28 orthogonal to the rotational position shown, in which event the filter will operate as a band stop filter rather than a band pass filter.

Inasmuch as the transmission characteristics are normalized as shown in FIGS. 2, 5 and 7, the maximum transmission ratio is unity. However all filters have losses and it is an important aspect to control such losses, especially in a filter that is configured for operation in an extended wavelength range extending into the infrared. In particular spectral ranges, such as a range up to about 3200 nm. In this wavelength range, there are distinct absorption bands, for example associated with oxygen-hydrogen and carbon-hydrogen chemical bonds. An O—H stretch absorption band occurs at 2985 nm (3350 cm$^{-1}$). Two C—H aliphatic absorption bands occur at 3496 and 3390 nm (2860 and 2950 cm$^{-1}$). These absorption bands limit the maximum transmission ratio in birefringent materials (both tunable and fixed) and in polarizers if such bonds are present.

One aspect of the present disclosure is to provide a structural configuration that minimizes the incidence of problematic absorption bands. As described above, the disclosed filter embodiments use a minimum number of birefringent elements. This corresponds to having a minimum number of interfaces between elements where adhesives, water vapor, antireflective coatings and the like may introduce materials with absorption characteristics in the wavelength range of interest.

FIGS. 3, 4 and 6 illustrate exploded views of several exemplary filters according to the foregoing disclosed aspects. The respective elements of the filter are to be abutted directly against one another and adhered in a manner that excludes absorptive materials insofar as possible and comprises materials selected for nonabsorbent characteristics. Additionally, certain index matching coatings are beneficial to reduce reflections.

Figure 8:
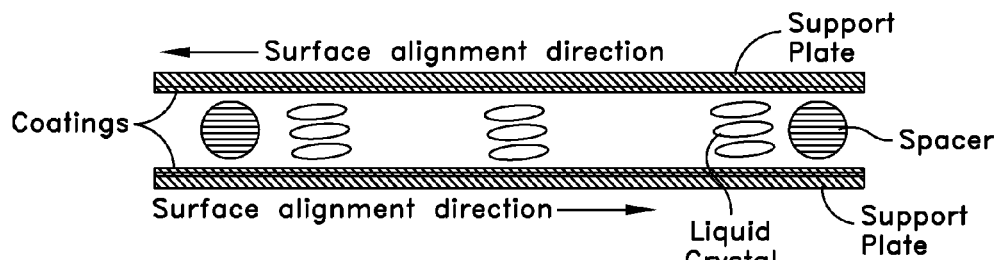
FIG. 8 is a schematic cross sectional illustration of a liquid crystal tunable birefringent element

FIG. 8 shows the structure of a liquid crystal tunable element 51, which is to be adhered to a fixed birefringent element 52 in optical alignment therewith. The liquid crystal material 62 generally comprises an off-the-shelf nematic, ferroelectric or similar liquid crystal material, for example as available from E. Merck, Darmstadt, D E and F. Hoffmann-LaRoche, Ltd., Basel, C H. The material occupies a spaced between two plates 63 that are held apart by spacers 64.

The liquid crystal molecules tend to conform in alignment, the direction of which is determined by treatment of the surface facing the liquid crystal material 62, for example by rubbing or ion bombardment. In an electro-optical embodiment wherein the birefringence is tuned using an electrical signal, applying a voltage across the material 62 varies the physical alignment of at least part of the liquid crystal molecules, thereby changing the birefringence of the material. The voltage is applied by contacts (not shown) coupled to conductive coatings 65 on the side of plates 63 facing the liquid crystal material. Substantially transparent indium tin oxide (ITO) layers can be used as conductive layers. The ITO is typically vapor deposited onto the substrate and can comprise successively applied layers. The first layer on the substrate is index matched to the substrate. Subsequent layers comprise a high transmission/low mobility ITO layer (high resistance), and a layer that is index matched to the liquid crystal alignment layer. The matching of optical indices reduces reflection. The alignment layer can comprise $SiO_2$ or polyimide and is rubbed or treated to provide an alignment surface. On the opposite substrate plates 63, the same coatings are used in the same order from the substrate plate toward the liquid crystal material.

Figure 9:
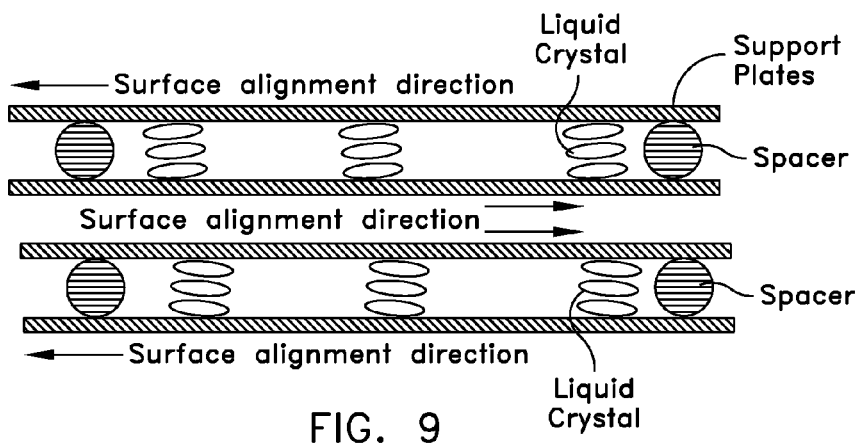
FIG. 9 is a schematic cross sectional illustration of a tunable birefringence with plural stacked liquid crystals.

FIG. 9 shows a comparable embodiment using two stacked liquid crystal elements, in this case having anti-parallel surface alignment directions. Building a tunable retarder from two cells with oppositely parallel alignments is good for improving the field of view (applicability to process light propagation at an angle other than normal to the parallel planes of the stacked elements).

The plates of the electro-optical cells as shown in FIGS. 8, 9 can be of various glass, crystal or similar materials. The following table presents specifications for such materials, including wavelength ranges over which the materials are reasonably transparent and associated optical indices of refraction where available.

TABLE 1

Electro-Optic Cell Substrate Materials

| Material | Wavelength Range | 50% transmission | 70% transmission | Index |
|---|---|---|---|---|
| Sapphire | 185-5000 nm | 5200 nm | 5000 nm | 1.76@630 nm |
| Fused Silica (IR grade) | 250-2500 | | 2500 | |
| Soda Lime | 350-2700 | 2800 | 2700 | 1.513@645 |
| Pyrex 7740 | 300-2700 | 2700 | 2560 | 1.473@589.3 |
| Borofloat | | 2600 | 2400 | 1.472@589.3 |
| GE Fused Quartz | 300-2500 | 2650 | 2550 | |
| Fused Silica (standard) | | 2300 | 2300 | 1.513 |
| Optical Glass(e.g., BK7) | 330-2100 | | | |
| Schott D263 T | 350-2680 | | 2710 | 1.532 |
| Corning 1737F | 350-2500 | | 2550 | |
| ZnSe | 350-2500 | | | |
| Si | | | | |
| Ge | | | | |

Figure 10:
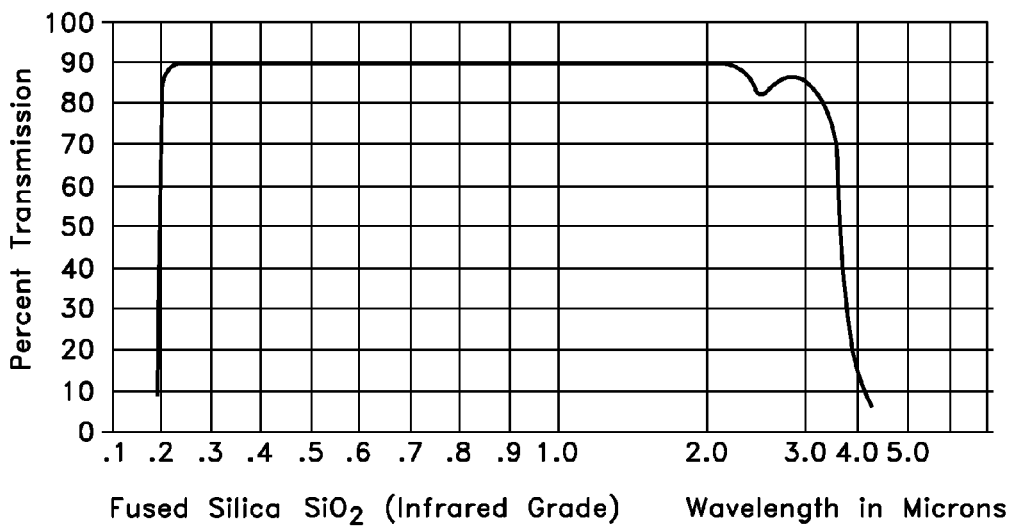
FIG. 10 is a transmission spectrum for fused silica ($SiO_2$).
Figure 11:
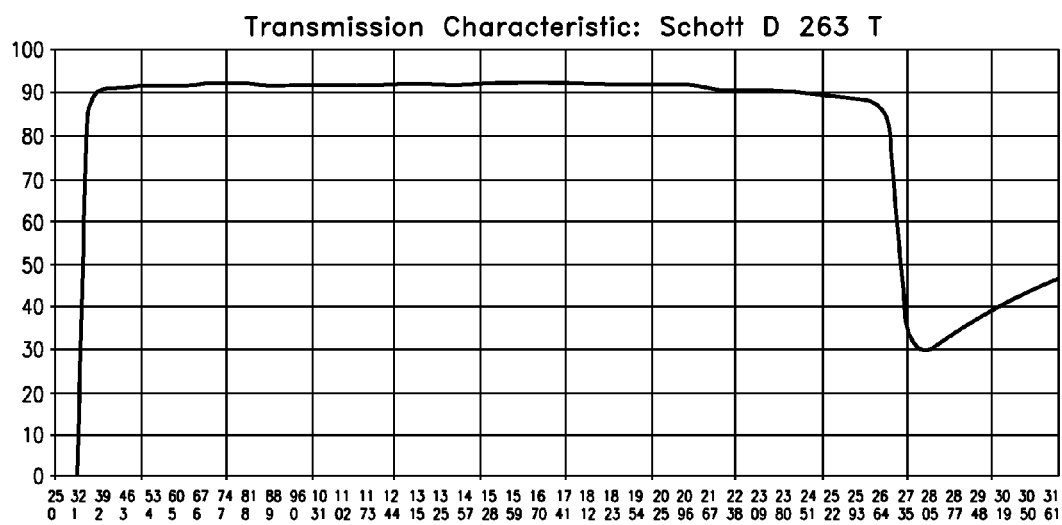
FIG. 11 is a transmission spectrum for Schott D 263 T material.
Figure 12:
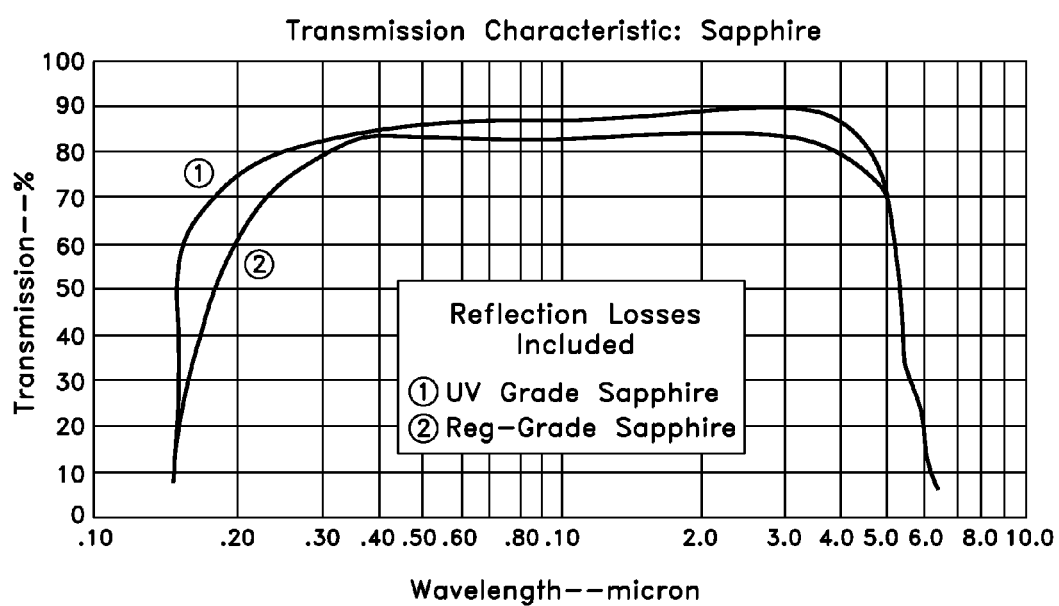
FIG. 12 is a transmission spectrum for sapphire.

FIGS. 10, 11 and 12 demonstrate the transmission characteristics of IR grade fused silica, Schott D263 T glass and standard and IR grade sapphire (crystalline $Al_2O_3$). In general, sapphire has the widest transmission range, but unfortunately that material is more expensive than some of the other options. Pyrex, BK7, etc. are borosilicate glasses.

Figure 13:
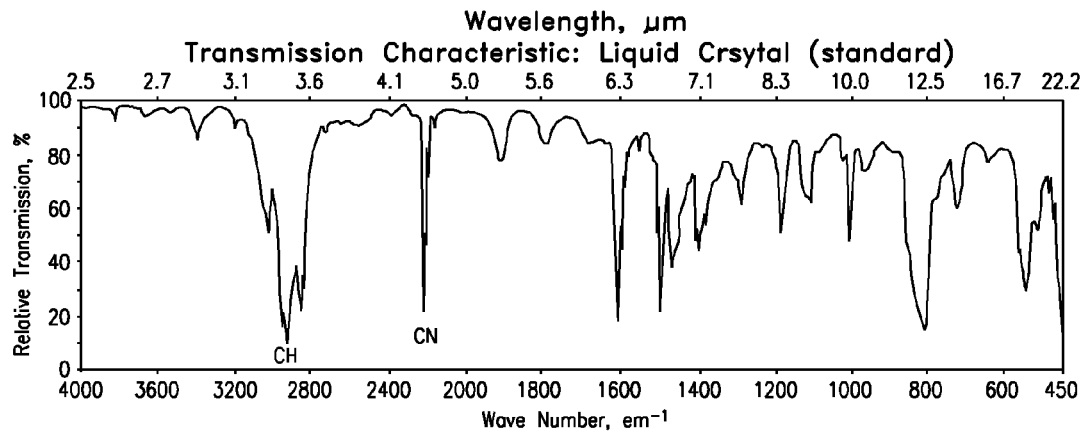
FIGS. 13 and 14 are comparative transmission characteristics for standard liquid crystal material versus treated (deuterated) liquid crystal material.
Figure 14:
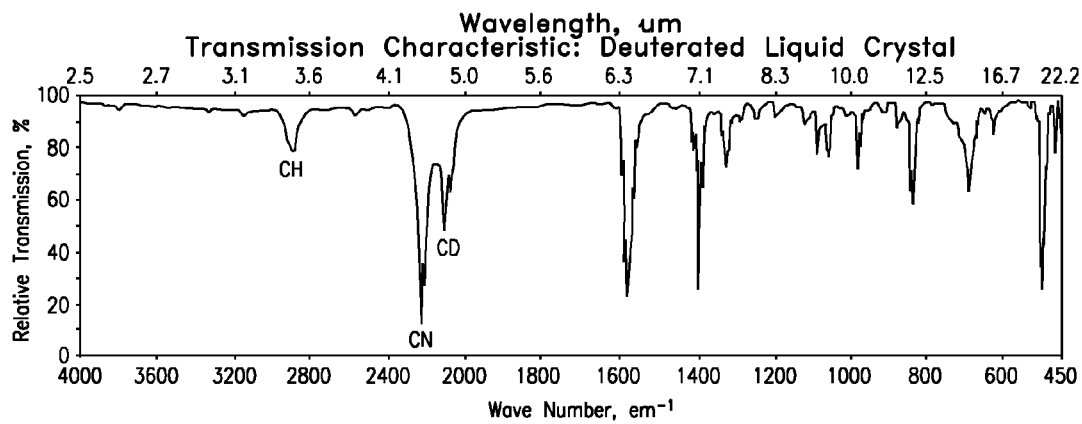

According to one embodiment, the liquid crystal material can be deuterated (modified with deuterium) to reduce the C—H absorption peak, as shown by a comparison of FIGS. 13 and 14. A new absorption peak occurs at a wavelength associated with carbon-deuterium bonds. Off the shelf liquid crystal materials may have a spectral range of 430-2800 nm. A deuterated liquid crystal material, although a more costly custom order, can have a useful range of 430-3300 nm. The transmission characteristics of exemplary standard liquid crystal and deuterated liquid crystal are shown in FIGS. 13 and 14, respectively. Depending on particular wavelengths of interest in the spectra versus the absorption bands as shown, one or the other of the liquid crystal material types may be the best choice in a given application.

Figure 15:
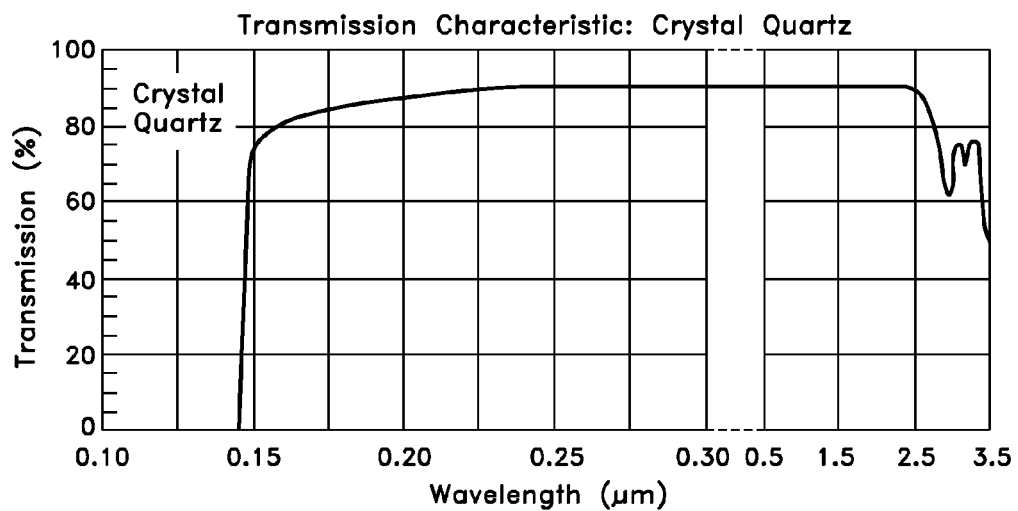
FIG. 15 is a transmission spectrum for crystal quartz.
Figure 16:
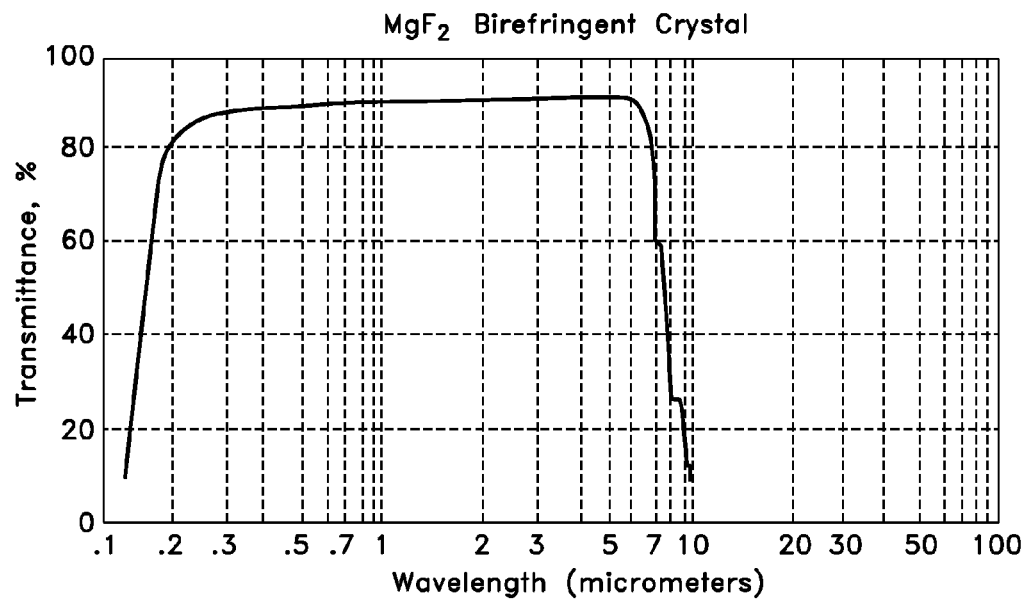
FIG. 16 is a transmission spectrum for $MgF_2$.

As discussed above, the liquid crystal cell 51 is optically aligned with and adhered directly to a fixed birefringent retarder. Table 2 illustrates specifications for several materials that can be used for the fixed retarder, including a comparison of the optical refractive indices of the materials along the fast and slow axes. FIGS. 15 and 16 demonstrate the transmission characteristics of two materials, namely crystal quartz and $MgF_2$.

TABLE 2

Fixed Birefringent Retarder Materials

| Material | Wavelength Range | Refractive Index 1 | Refractive Index 2 | test wavelength |
|---|---|---|---|---|
| Crystal Quartz | 185-2600 nm | 0.009 | 1.5 | 589 nm |
| a-BBO | 189-2600 | 0.115 | 1.602 | |
| $LiNbO_3$ | 420-5200 | 0.087 | 2.14 | |
| $MgF_2$ | 200-7000 | 0.01 | 1.38 | |
| $CaF_2$ | | | | |
| Calcite | | | | |
| $YVO_4$ | | | | |

Figure 17:
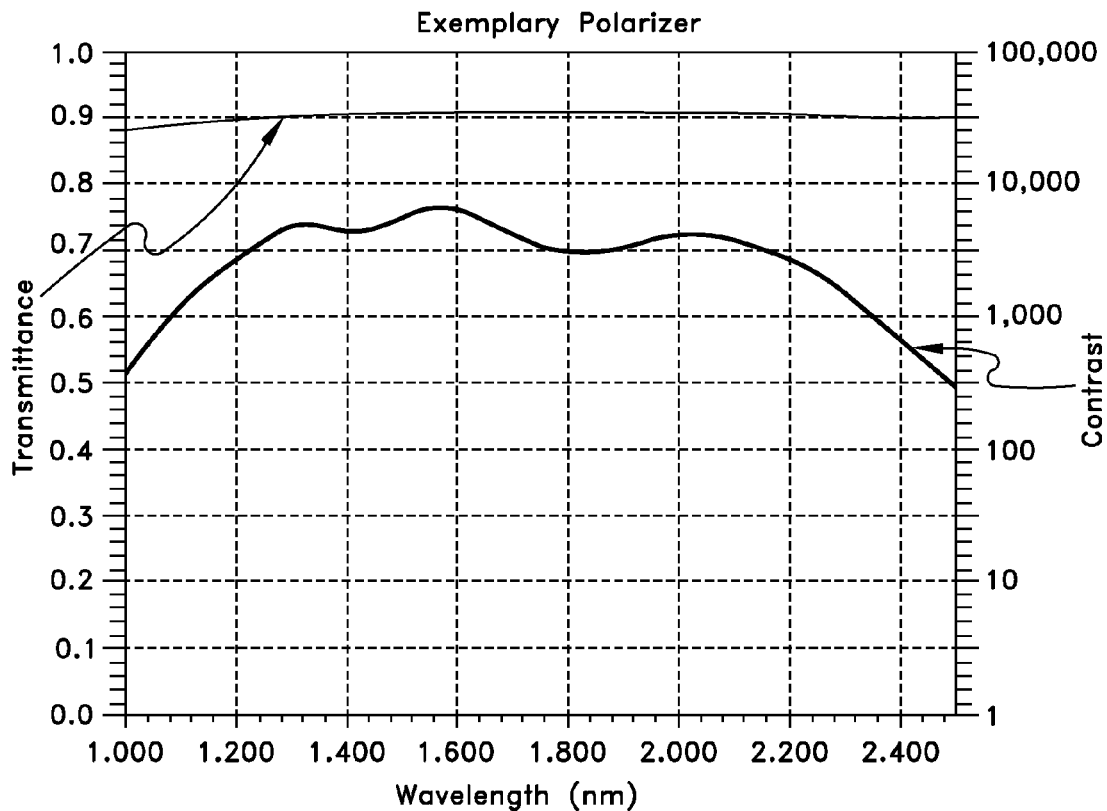
FIG. 17 is a plot comparing polarizer transmittance (left scale) and contrast (right scale) as a function of wavelength in near infrared wavelengths from 1,000 to 2,500 nm.

The input polarizer 27 and output or selection polarizer 28 are also subject to certain variations. Table 3 compares the operational wavelength ranges of several candidates for particular applications within the stated ranges. FIG. 17 is a dual plot comparing the light transmission level over wavelength to the contrast between parallel and orthogonal polarization components. The transmission level of the illustrated polarizer over the spectrum is relatively more constant than the contrast value. It is desirable to operated at a point in the range wherein the contrast is high and there is little transmission loss in the discriminated pass band.

Insofar as the disclosed filter embodiments may be configured by orientation of the output polarizer 28 for band stop operation as opposed to band pass operation, it may be appropriate to consider a reflective polarizer instead of an absorptive one. In particular, a reflective polarizer may control heating if the expected light signal is a high energy signal such as high powered laser radiation in the band that shall be blocked.

TABLE 3

Polarizer Materials and Wavelength Ranges

| Polarizer Material | Wavelength Range |
|---|---|
| Absorptive Film on Glass/Sapphire | 1000-2700 nm |
| Absorptive CODIXX (Silver Particles) on Glass | 1000-2700 |
| Reflective on Glass/Sapphire | 1000-5000 |
| C-Polarizer | |
| Prism Type, Glynn Thompson, Glynn Tylor, etc. | 1000-2500 |

FIG. 18 is a plot comparing two embodiments of the disclosed filter, wherein generally the dash-dot trace labeled SIRMCFD301 generally represents a more limited spectral range embodiment that is also relatively inexpensive, and the solid trace labeled ESIRMCFD401 represents an extended spectral range embodiment that is also more costly. FIG. 19 shows selected bandpass peaks over the range to which the extended range ESIRMCFD401 can be tuned and operated.

The plotted embodiment SIRMCFD301 demonstrates an example with an IR grade fused silica substrate (comparable performance might be expected from Schott D263T glass). The birefringent material is IR grade quartz with barium bromate index matching ($MgF_2$ is comparable). The liquid crystal material is off the shelf material and absorptive polarizers are used for the input and selection polarizers. The filter had an acceptable field of view of ±3° and an operational range from 1200 to 2500 nm (8333 to 4000 $cm^{-1}$) over which transmission was 5 to 30%. The discrimination band width (i.e., one comb filter transmission peak) is 30 $cm^{-1}$ at 6000 $cm^{-1}$. The tuning response time is approximately one second.

The extended range embodiment ESIDMCFD401 by comparison has a sapphire substrate. The birefringent material is $LiNbO_3$ with barium bromate index matching (or $MgF_2$). The liquid crystal material is deuterated liquid crystal material (florinated liquid crystal is comparable). The polarizer is a reflective wire grid polarizer on sapphire (with reflective light control). The filter had an acceptable field of view of ±3° and an operational range from 1800 to 3200 nm (5555 to 3125 $cm^{-1}$). The discrimination band width (i.e., one comb filter transmission peak) is 30 $cm^{-1}$ at 6000 $cm^{-1}$. The tuning response time is approximately one second.

An aspect of the disclosed invention is that the rotational alignment of the birefringent elements 33-39 is relatively tolerant of errors in alignment, up to a tolerance, for example, of ±5%. The extended range device is subject to variations in transmission ratios if moisture condenses on surface or is incorporated in adhesives at the interfaces of surfaces or in the compositions of the layers. Nevertheless, with the ability to tune the birefringence of the liquid crystals in unison and an effective configuration that has only a minimal number of discrete elements (i.e., as few as two birefringences 33, 35), the invention provides an effective filter for operation in the near infrared spectral area.

The invention having been disclosed and illustrated by examples, various modifications and variations can be seen as possible in light of the above teachings. It should be understood that the invention is not limited to the embodiments specifically used as examples, and reference should be made to the appended claims to assess the scope of the invention in which exclusive rights are claimed.

What is claimed is:

1. A spectral filter, comprising:
a plurality of birefringent elements coupled along a signal propagation path for successively advancing a polarization state of a discrimination wavelength from a predetermined polarization alignment at an input up to a predetermined polarization alignment at a selection polarizer, each of the birefringent elements having a fast axis and a slow axis at a right angle to one another, wherein each of the birefringent elements comprises an electrically tunable liquid crystal abutted with a fixed birefringent retarder, the liquid crystal having fast and slow axes aligned parallel to respective fast and slow axes of the fixed birefringent retarder, thereby defining a total thickness and birefringence, and the tunable liquid crystal retarders of each of said birefringent elements are coupled to a control voltage to be controlled in unison for equal retardation, so as to discriminate for at least one discrimination wavelength;

wherein a first of the birefringent elements along the signal propagation path is arranged with one of the respective fast and slow axes thereof at a rotational angle less than 45° to said polarization alignment at the input, whereby a light component oriented at the polarization alignment is divided unequally into said fast and slow axes;

wherein at least one subsequent one of the birefringent elements is rotationally displaced relative to the first of the birefringent elements;

wherein the plurality of birefringent elements occupies a series of rotation angles up to the selection polarizer;

wherein the selection polarizer passes a polarization component parallel to the predetermined polarization alignment of the selection polarizer and blocks a polarization component orthogonal thereto; and, wherein the discrimination wavelength is tunably selectable over a range extending to infrared wavelengths.

2. The spectral filter of claim 1, further comprising an input polarizer that defines said predetermined polarization alignment at the input.

3. The spectral filter of claim 1, wherein the plurality of birefringent elements are each aligned at one of two rotational orientations.

4. The spectral filter of claim 3, wherein the rotational orientations are substantially 22.5°±5° and 67.5°±5° relative to a zero axis defined by said polarization alignment.

5. The spectral filter of claim 1, wherein the plurality of birefringent elements are each aligned at one of three rotational orientations.

6. The spectral filter of claim 5, wherein the rotational orientations are substantially 12.5°±5°; 45.5°±5°; and 77.5°±5° relative to a zero axis defined by said polarization alignment.

7. The spectral filter of claim 1, wherein the plurality of birefringent elements are each aligned at one of four rotational orientations.

8. The spectral filter of claim 7, wherein the rotational orientations are substantially 7.5°±5°; 29.5°±5°; 60.5°±5°; and 82.5°±5° relative to a zero axis defined by said polarization alignment.

9. The spectral filter of claim 1, wherein the predetermined polarization alignment at the input is determined by an input polarizer.

10. The spectral filter of claim 1, wherein the predetermined polarization alignment at the input, and the rotation angles of the plurality of birefringent elements between the input and the selection polarizer, and the polarization alignment of the selection polarizer, define a series of rotational displacements from one to the next thereof; and wherein the rotational displacement between at least two adjacent ones thereof nearer to the input is equal to the rotational displacement between at least two adjacent ones thereof nearer to the selection polarizer.

11. A method for comb filtering a light signal, comprising:

arraying a set of birefringent elements between an input signal polarized at a predetermined polarization orientation and a selection polarizer, wherein each of the birefringent elements comprises an electrically tunable liquid crystal abutted with a fixed birefringent retarder, the liquid crystal having fast and slow axes aligned parallel to respective fast and slow axes of the fixed birefringent retarder, thereby defining a total thickness and birefringence, and the tunable liquid crystal retarders of each of said birefringent elements are coupled to a control voltage to be controlled in unison to be tuned for equal retardation, so as to discriminate for at least one discrimination wavelength;

setting a first of the birefringent elements to an optical orientation that unequally couples a component of the input signal at said predetermined polarization orientation to fast and slow axes of said first birefringent element;

setting at least one subsequent birefringent element in the set to an optical orientation that is rotationally displaced from the optical orientation of the first of the birefringent elements, by an angle that symmetrically distributes the birefringent elements over substantially a 90° angular span between the input signal and the selection polarizer; and, varying the control voltage for tuning the tunable liquid crystal retarders in unison, and for tuning the discrimination wavelength to an infrared wavelength.

12. The method of claim 11, wherein the predetermined polarization is established by an input polarizer and wherein the input polarizer and the selection polarizer have optical axes that are parallel, and further comprising operating the set of birefringent elements and the input and selection polarizers as a spectral band pass filter.

13. The method of claim 11, wherein the selection polarizer has an optical axis that is perpendicular to the predetermined polarization orientation, and further comprising operating the set of birefringent elements and the selection polarizer as a spectral band stop filter.

14. The spectral filter of claim 1, wherein the tunable liquid crystal retarders comprise at least one substrate comprising a material selected from the group consisting of sapphire, fused silica, soda lime, borosilicate glass, fused quartz, and ZnSe.

15. The spectral filter of claim 14, wherein the fixed birefringent retarder comprises a material selected from the group consisting of crystal quartz, a-BBO, $LiNbO_3$, $MgF_2$, $CaF_2$, Calcite and $YVO_4$.

16. The spectral filter of claim 15, wherein the liquid crystal comprises a deuterated material.

17. The spectral filter of claim 16, wherein the selection polarizer comprises a polarizing film on one of glass and sapphire.

18. The method of claim 11, wherein the infrared wavelength is in a range from visible to substantially 5000 nm.

19. The method of claim 11, wherein the infrared wavelength is in a range from visible to substantially 2800 nm.

20. The method of claim 11, wherein the infrared wavelength is in a range from visible to substantially 3300 nm.

21. The method of claim 11, wherein the liquid crystal comprises a material having a carbon-hydrogen (CH) absorption peak at an infrared wavelength and further comprising deuterating the material, whereby the absorption peak is reduced.

* * * * *